US012517347B2

(12) United States Patent
Bhatia et al.

(10) Patent No.: US 12,517,347 B2
(45) Date of Patent: Jan. 6, 2026

(54) POLYGON MIRROR

(71) Applicant: CORNING INCORPORATED, Corning, NY (US)

(72) Inventors: Vikram Bhatia, Painted Post, NY (US); Ravikumar Gopalrao Katare, Bridgewater, NJ (US); Imran Mukhtar, Corning, NY (US); Sang Ki Park, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 947 days.

(21) Appl. No.: 17/713,316

(22) Filed: Apr. 5, 2022

(65) Prior Publication Data

US 2022/0334381 A1    Oct. 20, 2022

Related U.S. Application Data

(60) Provisional application No. 63/175,810, filed on Apr. 16, 2021.

(51) Int. Cl.
*G02B 26/12* (2006.01)
*G01S 7/481* (2006.01)
*G01S 17/931* (2020.01)

(52) U.S. Cl.
CPC .......... *G02B 26/129* (2013.01); *G01S 7/4817* (2013.01); *G01S 17/931* (2020.01)

(58) Field of Classification Search
CPC .... G02B 26/129; G01S 7/4817; G01S 17/931
See application file for complete search history.

(56) References Cited

U.S. PATENT DOCUMENTS

| 5,953,147 A * | 9/1999 | Brandt ............... G02B 5/09 359/584 |
| 10,324,170 B1 | 6/2019 | Engberg, Jr. et al. |
| 2009/0213386 A1 | 8/2009 | Leblanc et al. |
| 2020/0049819 A1 | 2/2020 | Cho et al. |
| 2020/0284906 A1 | 9/2020 | Eichenholz et al. |

FOREIGN PATENT DOCUMENTS

WO    WO-02067021 A1 *  8/2002  ........... G02B 26/085

* cited by examiner

*Primary Examiner* — Jamil Ahmed
(74) *Attorney, Agent, or Firm* — Amy T. Lang (57) ABSTRACT

A polygon mirror that includes a top surface, a bottom surface, and a plurality of reflective surfaces disposed between the top surface and the bottom surface. Each reflective surface of the plurality of reflective surfaces forms an angle θ with an adjacent reflective surface. Additionally, each reflective surface of the polygon mirror has an RMS surface roughness of about 1.5 nm or less.

19 Claims, 5 Drawing Sheets

POLYGON MIRROR

This application claims the benefit of priority U.S. Provisional Patent Application Ser. No. 63/175,810 filed on Apr. 16, 2021, the content of which is relied upon and incorporated herein by reference in its entirety.

FIELD OF THE DISCLOSURE

The present disclosure is generally directed to a polygon mirror, and more particularly relates to a polygon mirror with a low surface roughness.

BACKGROUND OF THE DISCLOSURE

Light detection and ranging ("lidar") is used to measure a distance to an object by targeting the object with a light source and measuring the time for the reflected light to reach a receiver. This technology is commonly used in control and navigation systems for autonomous cars. However, the technology has a vast number of applications including the creation of topographical maps, such as for use in agricultural and forestry. The light source of a traditional lidar system is a laser, which emits light with infrared, visible, or ultraviolet wavelengths toward an object. The light is then reflected from the object and, in some systems, the distance to the object is determined based upon the time for the light to be reflected back to the lidar system.

A traditional lidar system houses a scanner that includes a polygon mirror with reflective surfaces. The polygon mirror rotates so that light from the light source reflects off the different reflective surfaces of the polygon mirror. The light is reflected outward, away from the lidar system, so that it scans an area for objects.

SUMMARY OF THE DISCLOSURE

Traditional polygon mirrors are formed of a metal, such as aluminum, which can be easily machined using a diamond-turning process. However, during such a process, the diamond-turning tools can leave marks or scratches on the polygon mirror, which can cause unwanted scattering of light within a lidar system.

An object of the present disclosure is to provide polygon mirrors with low surface roughness. Thus, the polygon mirrors disclosed herein are formed of a material that can be easily finished to have high surface quality with low surface roughness. In some embodiments, the material is a glass, glass ceramic, or ceramic. Furthermore, the polygon mirrors disclosed herein have a lower density, as compared with the traditional polygon mirrors, thus requiring less energy for their rotation in a lidar system.

Aspects of the present disclosure include a polygon mirror comprising a top surface, a bottom surface, and a plurality of reflective surfaces disposed between the top surface and the bottom surface. Each reflective surface of the plurality of reflective surfaces forms an angle θ with an adjacent reflective surface. Additionally, each reflective surface has an RMS surface roughness of about 1.5 nm or less.

Although many different embodiments are listed, the embodiments may exist individually or in any combination as possible. Hereinafter exemplary embodiments are shown and described.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

Figure 1:
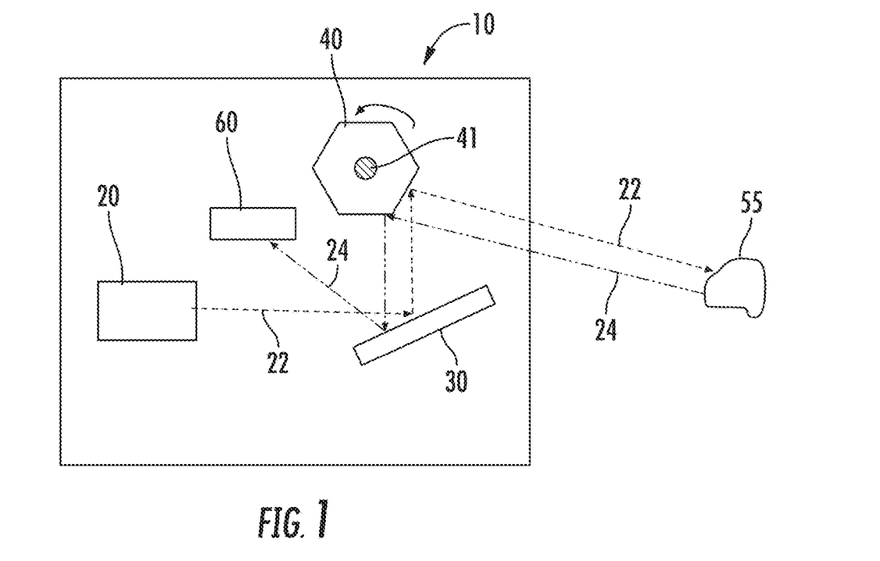
FIG. 1 is a schematic diagram illustrating a lidar system, according to embodiments of the present disclosure.

Referring now to FIG. 1, an exemplary lidar system 10 is shown, which includes a light source 20, an optical mirror 30, and a polygon mirror 40. In some embodiments, light source 20 is a laser configured to emit output light 22 with infrared, visible, or ultraviolet wavelengths. For example, light source 20 emits output light 22 having a wavelength from about 800 nm to about 1600 nm, or from about 800 nm to about 950 nm, or about 1550 nm. Light source 20 may be a pulsed laser and/or a laser diode.

Output light 22 from light source 20 is then reflected by optical mirror 30 and onto polygon mirror 40, where the light is reflected again by polygon mirror 40 and directed away from lidar system 10. More specifically, output light 22 is reflected by polygon mirror 40 a distance away from lidar system 10 and towards one or more objects. It is noted that the light reflected by polygon mirror 40 is contained within a field of view (FOV). In some embodiments, FOV has dimensions of about 120° by about 30° so that lidar system 10 is able to scan and capture objects within a 120° range in a lengthwise direction and a 30° range in a widthwise direction. However, the FOV can more or less than this range of about 120° by about 30°. The light reflected by polygon mirror 40 then reaches an object 55 within the FOV. As discussed further below, the light that is reflected from object 55 (reflected light 24) is directed from polygon mirror 40 to first mirror 30, where it is then reflected to a receiver 60.

Optical mirror 30 may be a pivoting mirror such as a galvo mirror. In some embodiments, optical mirror 30 rotates about an axis that is orthogonal to an axis of rotation of polygon mirror 40. As discussed above, optical mirror 30 reflects output light 22 towards a reflective surface of polygon mirror 40 and reflects reflected light 24 towards receiver 60.

Receiver 60 is configured to receive reflected light 24 and produce a corresponding electrical signal, such as an electrical current or voltage pulse. The electrical signal is then sent to a controller (not shown) for processing. More specifically, the controller determines the time of flight of the light (output light 22 plus reflected light 24), which is then used to determine the distance of object 55 from lidar system 10. For example, if the time of flight of the light is determined to be 100 ns, the controller may calculate the distance of object 55 from lidar system 10 to be 15 m. Receiver 60 may comprise a photoreceiver, optical receiver, optical sensor, detector, photodetector, and/or optical detector.

In some embodiments, lidar system 10 comprises two light sources 20 (first and second light sources) and two optical mirrors 30 (first and second optical mirrors) such that the first light source 20 directs output light 22 to the first optical mirror and the second light source directs output light 22 to the second optical mirror. The first optical mirror then reflects the light onto a first reflective surface of polygon mirror 40 and the second optical mirror reflects the light onto a second reflective surface of polygon mirror 40.

Although not shown in FIG. 1, lidar system 10 may include additional optical components such as, for example, lenses, mirror, filters, beam splitters, and/or polarizers. These components are configured to direct and modify output light 22 and/or reflected light 24.

Figure 2A:
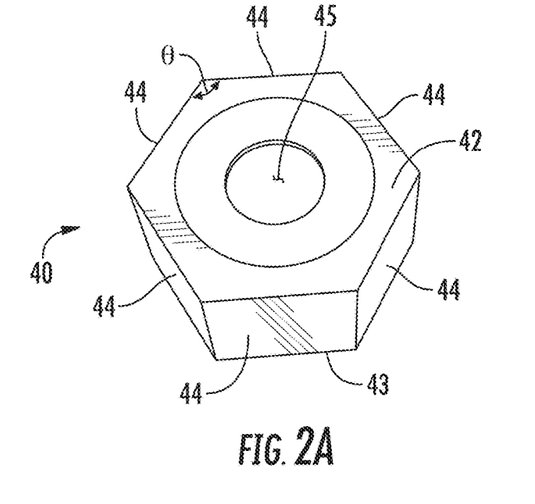
FIG. 2A is a schematic diagram illustrating an exemplary polygon mirror, according to embodiments of the present disclosure.

Polygon mirror 40 is a rotating prismatic or pyramidal member with multiple reflective surfaces. As shown in FIG. 1, a shaft of motor 41 is coupled to polygon mirror 40 to provide rotation of polygon mirror 40. FIG. 2A shows a first exemplary embodiment of polygon mirror 40 in which the mirror comprises a top surface 42, a bottom surface 43, and reflective surfaces 44. In this embodiment, polygon mirror 40 has six reflective surfaces 44. However, it is also contemplated that polygon mirror 40 can have more or less reflective surfaces 44. For example, polygon mirror 40 may be triangular-shaped with three reflective surfaces 44, or square-shaped with four reflective surfaces 44. In other embodiments, polygon mirror 40 comprises 5 or more reflective surfaces, or 8 or more reflective surfaces, or 10 or more reflective surfaces.

In the embodiment of FIG. 2A, reflective surfaces 44 are each orientated at an angle θ with regard to their adjacent reflective surfaces. In this embodiment, each reflective surface 44 forms an angle θ of 60° with an adjacent reflective surface. In embodiments that comprise three reflective surfaces 44, each reflective surface 44 forms an angle θ of 120° with an adjacent reflective surface. In embodiments that comprise four reflective surfaces 44, each reflective surface 44 forms an angle θ of 90° with an adjacent reflective surface. Furthermore, in embodiments that comprise five reflective surfaces 44, each reflective surface 44 forms an angle θ of 72° with an adjacent reflective surface. Angle θ may be in a range from about 60° to about 120°. Although reflective surfaces 44 are shown as flat, planar surfaces in FIG. 2A, it is also contemplated that the surfaces may be rounded and curved. For example, one or more reflective surfaces 44 may be concave or convex.

Figure 2B:
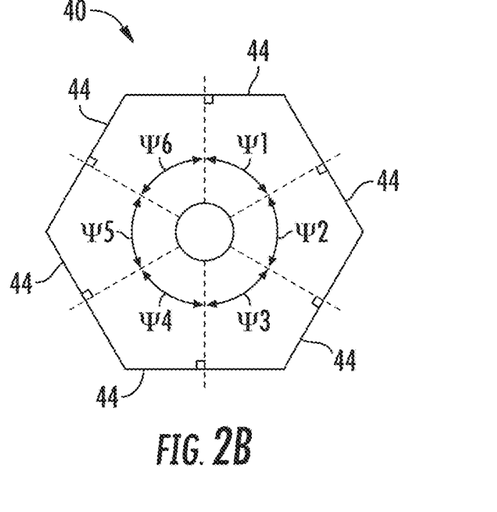
FIG. 2B is another schematic diagram illustrating an exemplary polygon mirror, according to embodiments of the present disclosure.

Reflective surfaces 44 are each oriented to provide a facet-to-facet angular variance of about 30 arc-seconds or less, or about 20 arc-seconds or less, or about 10 arc-seconds or less, wherein the facet-to-facet angular variance is the variation of the normal angles (Ψ) amongst the reflective surface. As shown in FIG. 2B, the normal angles (Ψ) are each formed between lines perpendicular to the facet of each reflective surface 44. In some embodiments, the facet-to-facet angular variance is within a range of about 5 arc-seconds to about 30 arc-seconds, or about 10 arc-seconds to about 20 arc-seconds.

As shown in FIG. 2A, polygon mirror 40 comprises an internal opening 45 for coupling with motor 41.

Figure 3A:
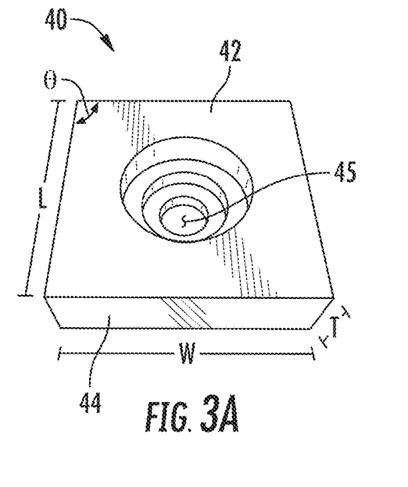
FIGS. 3A-3D are schematic diagrams illustrating an exemplary polygon mirror, according to embodiments of the present disclosure.
Figure 3B:
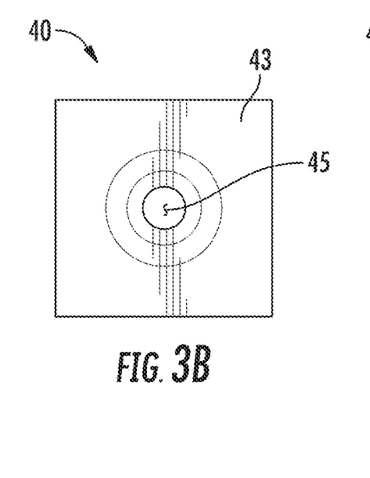
Figure 3C:
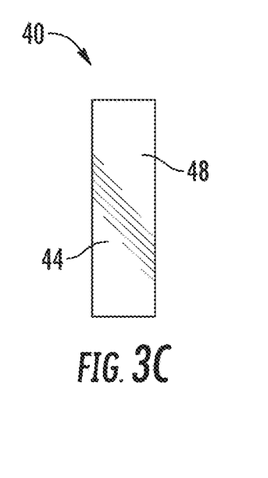
Figure 3D:
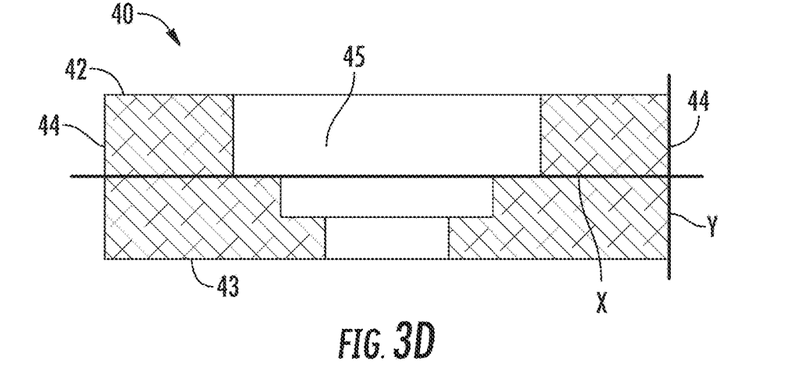

FIGS. 3A-3D depict another exemplary embodiment of polygon mirror 40 in which the mirror comprises four reflective surfaces 44. FIG. 3A shows a top, perspective view of polygon mirror 40, FIG. 3B shows a bottom view of polygon mirror 40, FIG. 3C shows a side view of polygon mirror 40, and FIG. 3D shows a cross-sectional view of polygon mirror. In this embodiment, reflective surfaces 44 form a 90° angle with adjacent reflective surfaces. Polygon mirror 40 is shown as forming a square in FIGS. 3A-3C such that top surface 42 and bottom surface 43 are each square-shaped. However, it is also contemplated that the polygon mirrors 40 disclosed herein may have a rectangular-shape. A length L of polygon mirror 40 may range from about 20 mm to about 80 mm, or from about 30 mm to about 60 mm. A width W of polygon mirror 40 may also range from about 20 mm to about 80 mm, or from about 30 mm to about 60 mm. Additionally, a thickness T of polygon mirror may range from about 5 mm to about 30 mm, or from about 10 mm to about 20 mm.

It is also contemplated that the corners between adjacent reflective surfaces 44 may be rounded or chamfered. In other embodiments, the corners between adjacent surfaces 44 may be textured to include, for example, grooves or ribs.

As shown in FIG. 3D, a pyramidal error of reflective surfaces 40 is measured as the deviation between an angle formed by lines X and Y amongst each reflective surface 40 of polygon mirror 40. It is noted that line Y in FIG. 3D is the outer facet of a reflective surface 44. In some embodiments, polygon mirror 40 has a pyramidal error of about 70 arc-seconds or less, or about 60 arc-seconds or less, or about 50 arc-seconds or less, or about 20 arc-seconds or less, or about 10 arc-seconds or less, or about 5 arc-seconds or less.

The reflective coating on reflective surfaces 44 may be disposed on the entirety of each reflective surface 40 (i.e., for the full width of the surface between top surface 42 and bottom surface 43) or disposed on less than the entire surface for one or more reflective surfaces 44. FIG. 3C shows an embodiment in which the entire reflective surface 44 is covered with a reflective coating 48. The reflective coating can be any material suitable to reflect light in the IR, NIR, and/or visible wavelengths. The reflective coating may comprise, for example, aluminum, sapphire, gold, silver, chrome, copper, nickel, titanium, or combinations thereof.

Figure 3E:
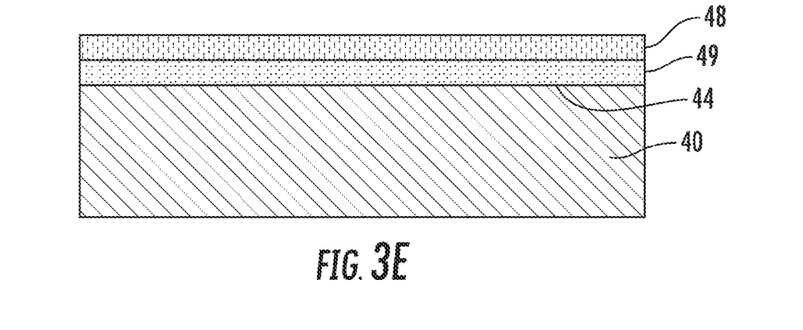
FIG. 3E is a schematic diagram illustrating exemplary coatings on the polygon mirror, according to embodiments of the present disclosure.

As shown in FIG. 3E, in some embodiments, reflective coating 48 may comprise an additional layer of a blocking or absorbing coating 49. Coating 49 may be disposed on an outward surface of reflective surfaces 44, such that coating 49 is disposed between reflective surfaces 44 and reflective coating 48. Furthermore, coating 49 may be configured to remove any stray infrared light by absorption. In some embodiments, coating 49 comprises a metal such as, for example, Al, Au, Ag, or Cr. In other embodiments, coating 49 comprises Si (amorphous or polycrystalline) or CrON. It is also contemplated that coating 49 comprises a combination of one or more of these materials.

In some embodiments, the reflective coating comprises dielectric layers of alternating layers of low and high refractive index materials. The materials with the low refractive index may have a refractive index in the range of about 1.35 to about 1.5 and may comprise, for example, $MgF_2$, $BaF_2$, and $SiO_2$. The materials with the high refractive index may have a refractive index of about 1.9 to about 3.8 and may comprise, for example, SiN ($Si_3N_4$), Si, $Ta_2O_5$, $Ta_2O_2$, $TiO_2$, $Pr_2O_3$, $Nb_2O_3$, $HfO_2$, $Al_2O_3$, $Nb_2O_5$, $ZrO_2$, and $Y_2O_3$.

The reflective coatings have a reflectance of about 85% or more, or about 90% or more, or about 95% or more, or about 99% or more across the IR, NIR, and visible wavelength spectrum. The thickness of the reflective coating is in a range from about 1 micron to about 10 microns, or about 3 microns to about 5 microns.

Polygon mirror 40 may be comprised of glass, glass ceramic, ceramic, or metal. Preferred materials are glass and glass ceramics, as discussed further below, and include, for example, silicate glass, an aluminosilicate glass, alkali aluminosilicate glass, alkaline aluminosilicate glass, borosilicate glass, boro-aluminosilicate glass, alkali aluminoborosilicate glass, alkaline aluminoborosilicate glass, soda-lime glass, fused quartz (fused silica), or other types of glass. Exemplary glass materials include, but are not limited to, high purity fused silica HPFS® sold by Corning Incorporated of Corning, New York under glass codes 7980, 7979, and 8655, and EAGLE XG® boro-aluminosilicate glass also sold by Corning Incorporated of Corning, New York. Other glass substrates include, but are not limited to, ultra-low expansion ULE® glass, Lotus™ NXT glass, Iris™ glass, WILLOW® glass, GORILLA® glass, VALOR® glass, Vycor™ glass, or PYREX® glass sold by Corning Incorporated of Corning, New York. In some embodiments, polygon mirror 40 is comprised of float glass, such as soda lime glass. In yet other embodiments, polygon mirror 40 is comprised of silica glass with 80 wt. % or more of silica, or 85 wt. % or more of silica, or 90 wt. % or more of silica, or 95 wt. % or more of silica, or 99 wt. % or more of silica.

Exemplary glass ceramics include, for example, lithium disilicate, nepheline, beta-spodumene, and beta-quartz. Exemplary commercially available materials include, for example, Macor® and Pyroceram® sold by Corning Incorporated of Corning, New York.

The material of polygon mirror 40 should be capable of achieving the low surface roughness disclosed further below, regardless of the transparency of the material.

The polygon mirrors 40 disclosed herein have a lower density compared with the traditional aluminum polygon mirrors. More specifically, the density of polygon mirror 40 has a density of less than about 2.7 g/cc, or about 2.5 g/cc or less, or about 2.2 g/cc or less, or about 2.0 g/cc or less, or about 1.8 g/cc or less. In some embodiments, the density of polygon mirror 40 is about 2.2 g/cc, or about 2.3 g/cc. This is much less than the traditional aluminum polygon mirrors, which have a density of 2.7 g/cc. By having a lower density, the polygon mirrors 40 disclosed herein are lighter and, thus, require less energy to rotate. Therefore, they have a reduced power consumption in lidar system 10, which advantageously lowers costs. Furthermore, the lower density of polygon mirrors 40 enables a faster rotating start-up rate from a state of rest.

As discussed above, traditionally polygon mirrors were formed of aluminum, such as 6061 alloy, because they could be machined using a diamond-turning process. However, the aluminum material is prone to scratching or marking by the diamond-turning tools, which causes unwanted scattering of the light in a lidar system. The polygon mirrors 40 disclosed herein need not be made by such diamond-turning processes, thus providing polygon mirrors without such scratching or marking. As discussed further below, due to the material that they are comprised of, the polygon mirrors 40 disclosed herein may be made by such processes as polishing and/or molding, which do not cause such scratches and marks on the produced polygon mirror. Thus, the polygon mirrors 40 disclosed herein have a smoother finish with a lower surface roughness, as compared with the traditional polygon mirrors formed of aluminum. Due to their lower surface roughness, the polygon mirrors 40 disclosed herein have less unwanted scattering of light. Therefore, more light is reflected onto object 55 and input into receiver 60, which provides a more accurate determination of the distance of object 55 from lidar system 10. Furthermore, improving the surface roughness of the mirrors also improves the ratio of signal to noise in the detected light.

In some embodiments, each reflective surface 44 of polygon mirror 40 has a low RMS (root mean square) surface roughness in a range from about 2.0 nm or less, or about 1.5 nm or less, or about 1.0 nm or less, or about 0.5 nm or less, or about 0.25 nm or less, or about 0.15 nm or less, or about 0.10 nm or less, as measured by white light interferometry using a spatial frequency within a range from 5 mm$^{-1}$ to 1,000 mm$^{-1}$. In some embodiments, reflective surfaces 44 each have an RMS surface roughness of about 0.45 nm, or about 0.43 nm, or about 0.42 nm. The RMS surface roughness is determined using equation (1):

$$S_q = \sqrt{\frac{1}{A}\int_A Z^2(x, y)dxdy} \quad (1)$$

wherein Sq is the RMS surface roughness, A is the total measurement area (micrometers$^2$), and Z is the measured residual height data array in the space domain (nm), wherein Z is measured using white light interferometry using the spatial frequency within the range from 5 mm$^{-1}$ to 1,000 mm$^{-1}$.

As discussed above, the polygon mirrors 40 disclosed herein can be produced by polishing and/or molding processes. More specifically, the material of polygon mirror 40 is capable of being shaped and formed by a polishing and/or molding process. For example, the glass, glass ceramic, and ceramic materials disclosed above are configured to obtain high surface quality (e.g., low surface roughness) through such polishing and/or molding processes. Thus, the polygon mirrors 40 disclosed herein do not need to rely on a diamond-turning process to shape and form the polygon mirrors.

Exemplary polishing processes may include a rough polish/grind followed by a fine polish/grind. In other embodiments, polygon mirrors 40 are shaped and formed using other chemical and/or mechanical processes, such as, for example, a chemical mechanical planarization (CMP) process, an ion beam material removal process, a dry plasma etching process, or a wet etch process.

Figure 4A:
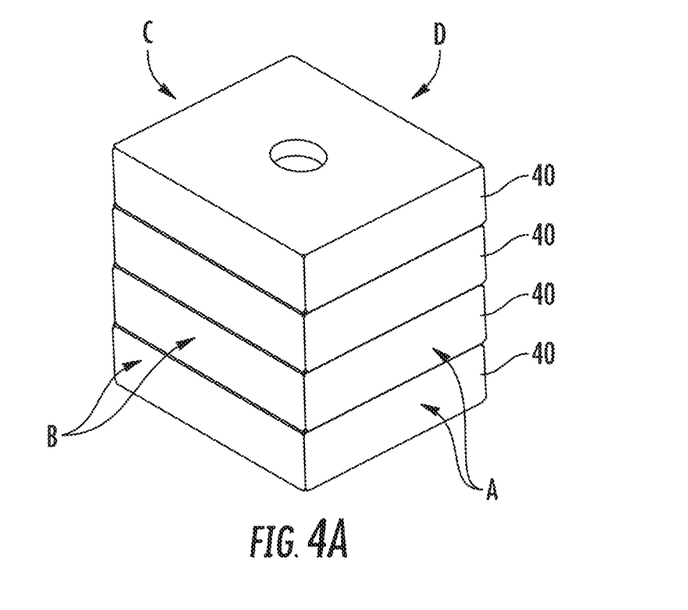
FIG. 4A is a schematic diagram illustrating a process to produce a polygon mirror, according to embodiments of the present disclosure.

In one exemplary process, as shown in FIG. 4A, multiple polygon mirrors 40 are stacked on top of each and polished simultaneously. For example, side A of the multiple polygon mirrors 40 are each polished simultaneously, followed by side B of the multiple polygon mirrors 40, then side C, followed by side D. In other embodiments, sides A and C of the multiple polygon mirrors 40 are polished together simultaneously in a double-sided polishing procedure, followed by the polishing of sides B and C simultaneously. Stacking the polygon mirrors 40 on top of each and polishing one or more sides simultaneously with the other stacked polygon mirrors, reduces time and resources, thus providing a more efficient polishing procedure.

Figure 4B:
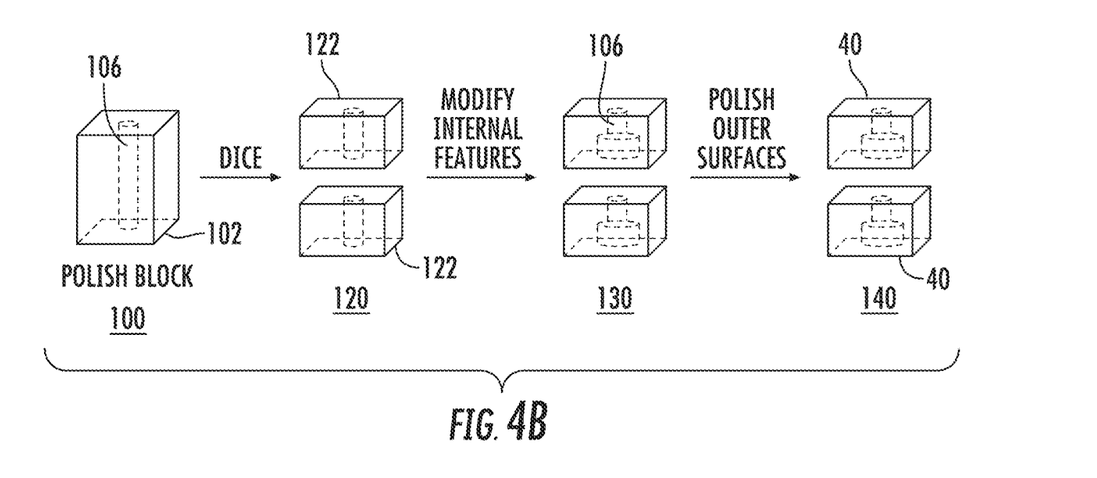
FIG. 4B is another schematic diagram illustrating a process to produce a polygon mirror, according to embodiments of the present disclosure.

FIG. 4B shows another exemplary process to form multiple polygon mirrors 40 simultaneously. In this exemplary process, at step 100, opening 106 is first formed in blank 102. Opening 106 may be a cylindrical aperture within blank 102. Next, at step 110, blank 102 is segmented and diced into multiple units 122. Each unit 122 may represent a single polygon mirror 40. Then, at step 130, internal features of opening 106 are modified and/or added. For example, a portion of opening 106 is enlarged so that opening 106 has a non-uniform diameter across its length. At step 140, the outer surfaces of units 122 are then polished. Each unit 122 may be polished separately, or multiple units 122 may be stacked together and polished simultaneously, as discussed above. Step 140 may produce polished polygon mirrors 40 with a high surface quality. In the polished polygon mirror 40, opening 106 may be configured for a shaft of a motor to be disposed therethrough. It is also noted that the process shown in FIG. 4B may include all or less than of all of steps 100 through 140.

Figure 5A:
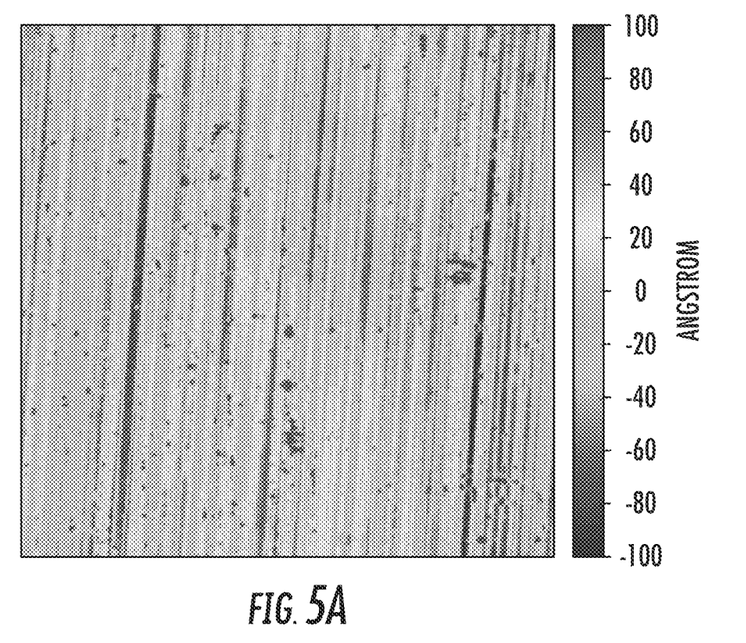
FIG. 5A is an image of a surface profile of a traditional polygon mirror.
Figure 5B:
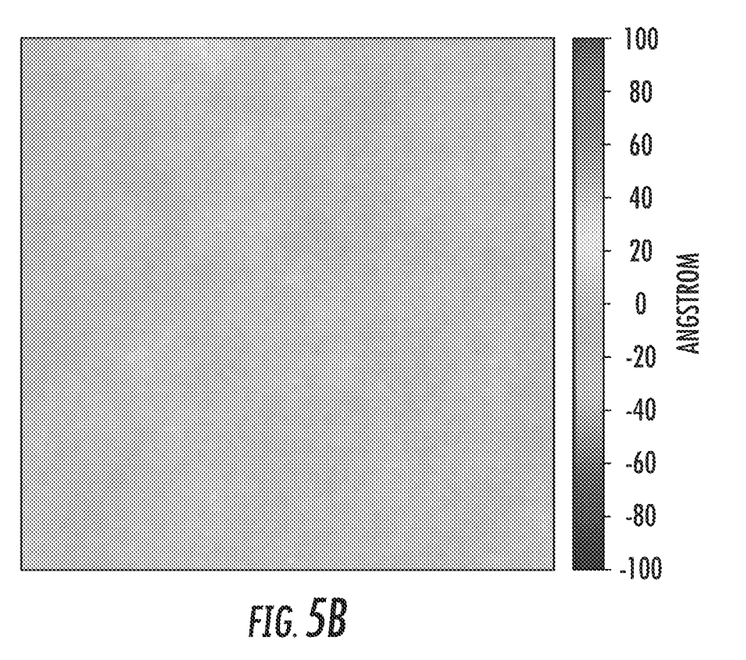
FIG. 5B is an image of a surface profile of an exemplary polygon mirror, according to embodiments of the present disclosure.

FIGS. 5A and 5B show a comparison of surface profiles for a traditional polygon mirror formed of aluminum 6061 AA (FIG. 5A) and an exemplary polygon mirror formed of HPFS® glass (FIG. 5B). The traditional polygon mirror was formed by a diamond-turning process. However, the exemplary polygon mirror was formed by a polishing process as disclosed herein. The surface profiles of FIGS. 5A and 5B were measured using a white-light interferometer. As shown in FIG. 5A, the diamond-turned traditional polygon mirror has a streaky surface profile, due to the tool marks from the diamond-turning process. The RMS surface roughness of the traditional polygon mirror was determined to be 4 nm. In comparison, the exemplary polygon mirror of FIG. 5B does not have a streaky surface profile. Furthermore, the RMS surface roughness of the exemplary polygon mirror in FIG. 5B was determined to be 0.43 nm, which is a significant improvement from the traditional polygon mirror.

Figure 6:
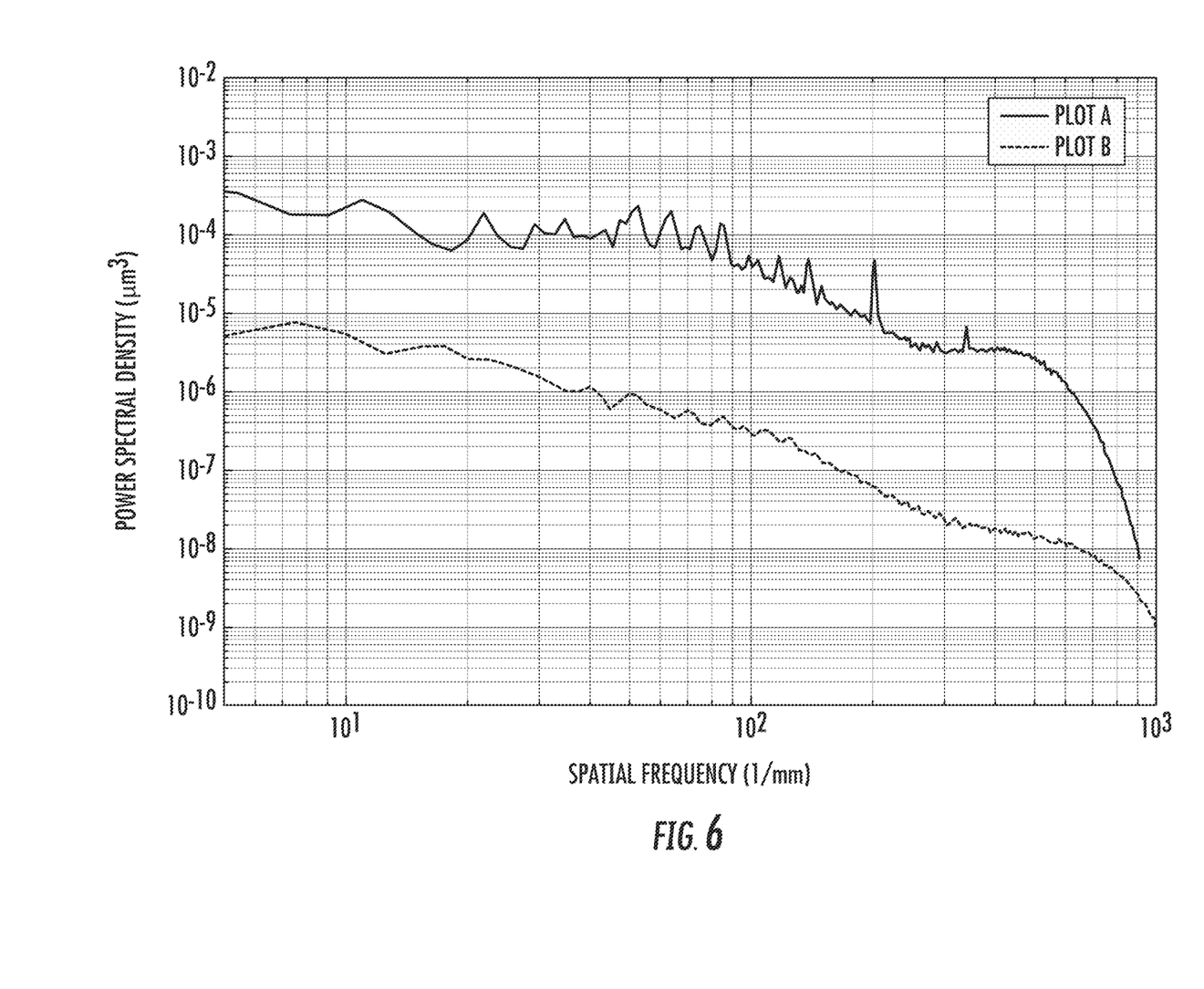
FIG. 6 is a plot of power spectral densities of a traditional polygon mirror and an exemplary polygon mirror.

FIG. 6 shows the power spectral densities (PSD) for the polygon mirrors of FIGS. 5A and 5B. Therefore, plot A in FIG. 6 represents the traditional polygon mirror formed of aluminum 6061 AA (as also shown in FIG. 5A), and plot B of FIG. 6 represents the exemplary polygon mirror formed of HPFS® glass (as also shown in FIG. 5B). Plot B in FIG. 6 has a lower PSD over the specified frequency spectrum. It is noted that PSD can be used to analyze surface roughness. PSD provides a representation of the amplitude of a surface's roughness as a function of the spatial frequency of the roughness. Thus, plot B has a lower power spectral density over the specified frequency spectrum, as compared with plot A, and, therefore, also has a lower surface roughness. More specifically, the PSD of plot B is reduced by two orders of magnitude from the PSD of plot A.

The polygon mirrors 40 disclosed herein can be used in other systems than a lidar system, such as, for example, bar code scanners, laser printers, and laser markers.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A polygon mirror comprising:
a top surface and a bottom surface; and
a plurality of reflective surfaces disposed between the top surface and the bottom surface, each reflective surface of the plurality of reflective surfaces forming an angle θ with an adjacent reflective surface,
wherein each reflective surface has an RMS surface roughness of about 1.5 nm or less, and wherein the polygon mirror has a density of less than about 2.7 g/cc.

2. The polygon mirror of claim 1, wherein the RMS surface roughness is about 1.0 nm or less.

3. The polygon mirror of claim 2, wherein the RMS surface roughness is about 0.5 nm or less.

4. The polygon mirror of claim 1, wherein the polygon mirror is formed of a glass, glass ceramic, or ceramic material.

5. The polygon mirror of claim 4, wherein the polygon mirror is formed of silica glass.

6. The polygon mirror of claim 5, wherein the polygon mirror is formed of silica glass with 90 wt. % or more of silica.

7. The polygon mirror of claim 5, wherein the polygon mirror is formed of aluminosilicate glass, alkali aluminosilicate glass, alkaline aluminosilicate glass, borosilicate glass, boro-aluminosilicate glass, alkali aluminoborosilicate glass, alkaline aluminoborosilicate glass, or combinations thereof.

8. The polygon mirror of claim 5, wherein the polygon mirror is formed of high purity fused silica glass.

9. The polygon mirror of claim 1, wherein the density is about 2.5 g/cc or less.

10. The polygon mirror of claim 9, wherein the density is about 2.2 g/cc or less.

11. The polygon mirror of claim 1, wherein the plurality of reflective surfaces each comprise a reflective coating.

12. The polygon mirror of claim 11, wherein the reflective coating is configured to reflect light in the IR, NIR, or visible wavelengths.

13. The polygon mirror of claim 12, wherein the reflective coating comprises aluminum, sapphire, gold, silver, chrome, copper, nickel, titanium, or combinations thereof.

14. The polygon mirror of claim 12, wherein the reflective coating comprises dielectric layers of alternating layers of low and high refractive index materials.

15. The polygon mirror of claim 11, wherein the reflective coating has a reflectance of about 99% or more across the IR, NIR, and visible wavelength spectrum.

16. The polygon mirror of claim 1, further comprising a blocking coating disposed on the reflective surfaces.

17. The polygon mirror of claim 16, wherein the blocking coating comprises Al, Au, Ag, Cr, Si, CrON, or combinations thereof.

18. The polygon mirror of claim 1, wherein the angle $\theta$ is in a range from about 60° to about 120°.

19. The polygon mirror of claim 18, wherein the angle $\theta$ is about 90°.

* * * * *